United States Patent
Ueki et al.

(10) Patent No.: US 12,030,564 B2
(45) Date of Patent: Jul. 9, 2024

(54) TRACKED VEHICLE

(71) Applicant: HITACHI CONSTRUCTION MACHINERY CO., LTD., Tokyo (JP)

(72) Inventors: Tomohiro Ueki, Ibaraki (JP); Takeshi Shibukawa, Ibaraki (JP); Tomoharu Morita, Ibaraki (JP); Yutaro Iwabuchi, Ibaraki (JP); Taira Yamabuki, Ibaraki (JP); Koki Sugiyama, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 597 days.

(21) Appl. No.: 17/251,074

(22) PCT Filed: Feb. 19, 2019

(86) PCT No.: PCT/JP2019/006019
§ 371 (c)(1),
(2) Date: Dec. 10, 2020

(87) PCT Pub. No.: WO2020/170326
PCT Pub. Date: Aug. 27, 2020

(65) Prior Publication Data
US 2021/0122434 A1 Apr. 29, 2021

(51) Int. Cl.
*B62D 55/06* (2006.01)
*B62D 55/088* (2006.01)
(Continued)

(52) U.S. Cl.
CPC ............. *B62D 55/06* (2013.01); *B62D 55/10* (2013.01); *F16H 57/02* (2013.01); *E02F 9/02* (2013.01); *F16H 2057/02056* (2013.01)

(58) Field of Classification Search
CPC ........ B62D 55/06; B62D 55/10; B62D 55/12; B62D 55/125; B62D 55/13; B62D 55/088; E02F 9/02
See application file for complete search history.

(56) References Cited

U.S. PATENT DOCUMENTS

| | | | | |
|---|---|---|---|---|
| 3,869,061 A | * | 3/1975 | Wanner | E02F 9/02 976/DIG. 320 |
| 2007/0029878 A1 | * | 2/2007 | Gaudreault | E02F 9/02 305/130 |
| 2009/0078528 A1 | * | 3/2009 | Uzawa | E02F 9/02 192/12 D |

FOREIGN PATENT DOCUMENTS

| | | |
|---|---|---|
| CN | 202879635 U | 4/2013 |
| JP | 62-114826 U | 7/1987 |

(Continued)

OTHER PUBLICATIONS

JP2008-155886 to Iijima, english translation (Year: 2006).*
(Continued)

*Primary Examiner* — Anne Marie M Boehler
(74) *Attorney, Agent, or Firm* — MATTINGLY & MALUR, PC

(57) ABSTRACT

A traveling motor (19) of a reduction device (16) is mounted on a reduction gear (17) in a state protruding to an inner side in a left-and-right direction from a left side frame (7) and a right side frame (14) toward a center frame (6). Moreover, a motor guard (22) provided on a rear side which is the other side in a front-and-rear direction of each of the side frames (7) and (14), respectively, and covering the traveling motor (19) is constituted by an inner guard member (23) covering the traveling motor (19) and an outer guard member (25) covering the inner guard member (23) from an outer side.

3 Claims, 9 Drawing Sheets

(51) Int. Cl.
*B62D 55/10* (2006.01)
*F16H 57/02* (2012.01)
*E02F 9/02* (2006.01)

(56) References Cited

FOREIGN PATENT DOCUMENTS

| | | | | |
|---|---|---|---|---|
| JP | 08-058643 | A | 3/1996 | |
| JP | 2000-264267 | A | 9/2000 | |
| JP | 2000-326876 | A | 11/2000 | |
| JP | 2001-171567 | A | 6/2001 | |
| JP | 2002-173062 | A | 6/2002 | |
| JP | 2008-155886 | * | 7/2006 | ........... B62D 55/088 |
| JP | 2012-179926 | * | 9/2020 | ........... B62D 55/088 |

OTHER PUBLICATIONS

International Search Report of PCT/JP2019/006019 dated Apr. 9, 2019.
Chinese Office Action received in corresponding Chinese Application No. 201980044473.2 dated May 31, 2022.

* cited by examiner

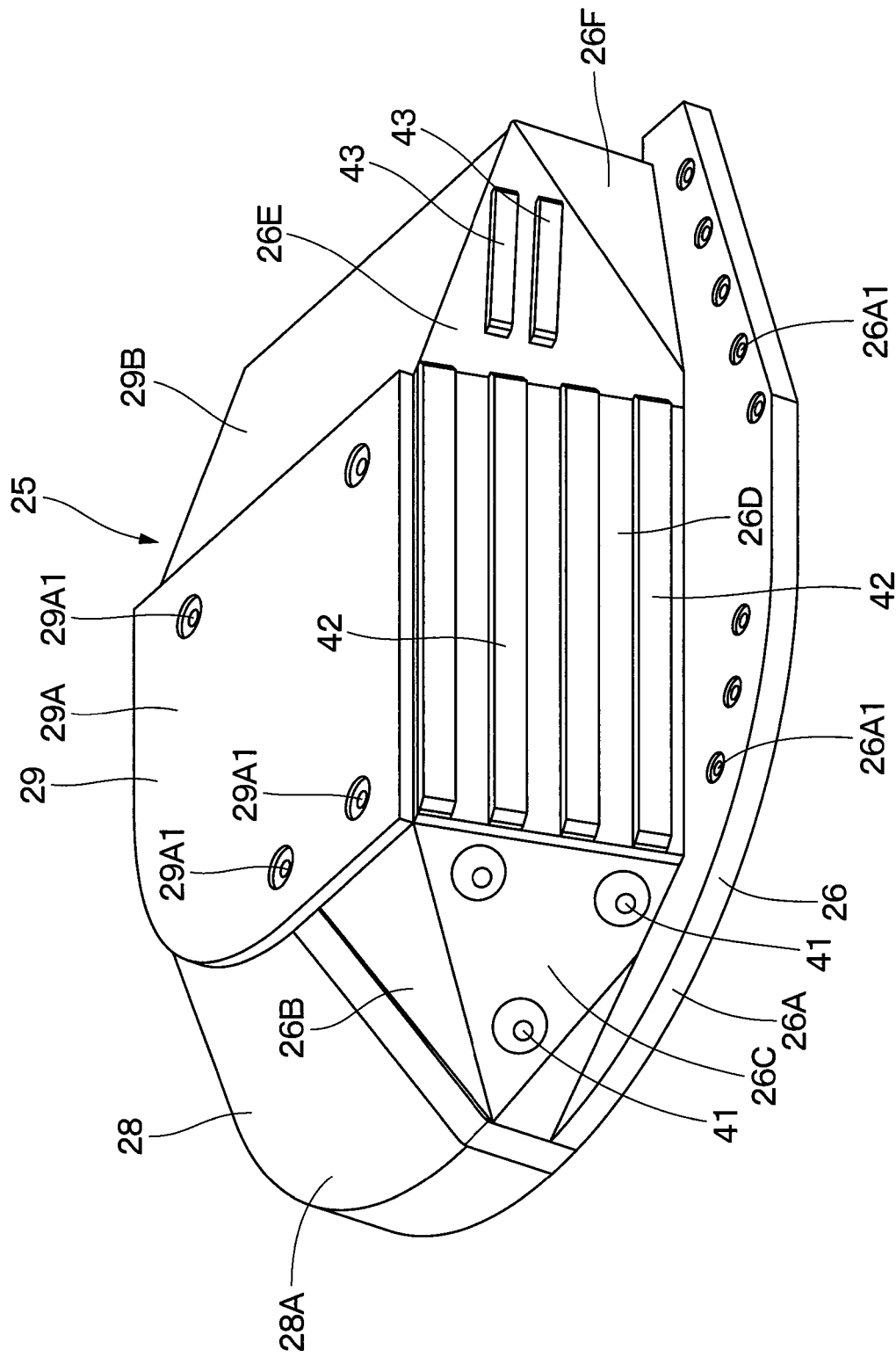

US 12,030,564 B2

TRACKED VEHICLE

TECHNICAL FIELD

The present invention relates to a tracked vehicle such as a hydraulic excavator and the like traveling by revolving a crawler belt by a traveling motor, for example.

BACKGROUND ART

A hydraulic excavator as a typical example of a tracked vehicle is constituted in general by a lower traveling structure capable of traveling in a front-and-rear direction, an upper revolving structure mounted on the lower traveling structure, capable of revolving, and a front device provided at a front position of the upper revolving structure, capable of facing up and down. And the hydraulic excavator can travel on a working site. Moreover, the hydraulic excavator can perform an operation of excavating earth and sand by using the front device.

The lower traveling structure is constituted by including a center frame forming a support structural body for supporting the upper revolving structure on the lower traveling structure, side frames provided on both left and right sides of the center frame by extending in the front-and-rear direction, respectively, an idler wheel provided on one sides in the front-and-rear direction of the side frames, respectively, a reduction device provided on the other sides in the front-and-rear direction of the side frames, respectively, and constituted by a reduction gear and a traveling motor, a drive wheel provided by being connected to output sides of the reduction gears of the reduction devices, respectively, and a crawler belt looped around the idler wheels and the drive wheels, respectively.

Moreover, a motor guard located on the other side in the front-and-rear direction of the side frame on which the reduction device is provided and covering the traveling motor is provided on the lower traveling structure (Patent Document 1). This motor guard has a base end side mounted on the reduction gear of the reduction device and a distal end side extending in a horizontal direction covering the traveling motor from a lower side.

PRIOR ART DOCUMENT

Patent Document

Patent Document 1: Japanese Patent Laid-Open No. 2000-264267 A

SUMMARY OF THE INVENTION

Incidentally, the motor guard is mounted in a cantilever state with respect to the reduction gear of the reduction device in the invention of the Patent Document 1. In this case, the structure of the motor guard needs to be reinforced in order for the motor guard with the cantilever structure to protect the traveling motor from rocks, stones and the like. That is, a thickness dimension of a metal plate constituting the motor guard needs to be increased or a reinforcing rib needs to be added in order to improve strength. Thus, manufacture of the motor guard requires labor, a weight is increased, and a mounting work becomes difficult, which is a problem.

The present invention was made in view of the aforementioned problem of the prior art, and an object of the present invention is to provide a tracked vehicle in which the traveling motor can be protected by a motor guard with a simple structure, and a weight of the motor guard can be reduced.

The present invention is characterized in that, in a tracked vehicle including a center frame forming a support structural body of a vehicle body, a side frame provided on both left and right sides of the center frame by extending in the front-and-rear direction, respectively, an idler wheel provided on one sides in the front-and-rear direction of the side frames, respectively, a reduction device provided on the other sides in the front-and-rear direction of the side frames, respectively, and constituted by a reduction gear and a traveling motor, a drive wheel provided by being connected to output sides of the reduction gears of the reduction devices, respectively, a crawler belt looped around the idler wheels and the drive wheels, respectively, and a motor guard provided on the other sides in the front-and-rear direction of the side frames, respectively, and covering the traveling motor of the reduction device, the traveling motor is mounted on the reduction gear in a state protruding to an inner side in a left-and-right direction from the side frame toward the center frame, and the motor guard is constituted by an inner guard member covering the traveling motor and an outer guard member covering the inner guard member from an outer side.

According to the present invention, the traveling motor can be protected by the motor guard with a simple structure, and the weight of the motor guard can be reduced.

BRIEF DESCRIPTION OF THE DRAWINGS

FIG. 9 is a perspective view showing the outer guard member according to a second embodiment, shown from a lower side.

MODE FOR CARRYING OUT THE INVENTION

Figure 1:
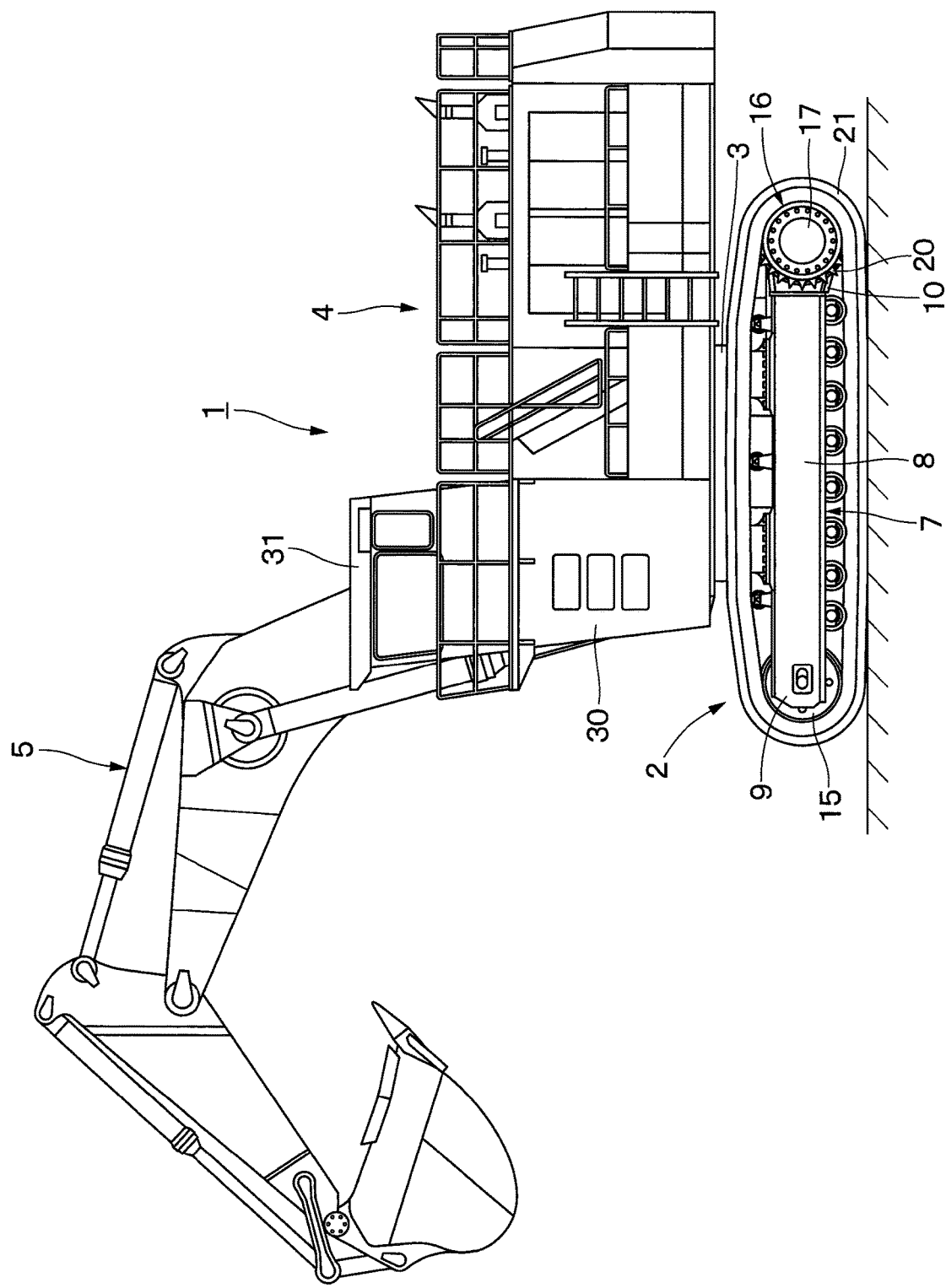
FIG. 1 is a front view showing a hydraulic excavator according to the first embodiment of the present invention.

Hereinafter, a super large-sized hydraulic excavator including a backhoe-type front device is used as a typical example of a tracked vehicle according to an embodiment of the present invention and will be explained in detail referring to the accompanying drawings.

It is to be noted that a front side and a rear side of a lower traveling structure are changed depending on a revolving position of an upper revolving structure in the hydraulic excavator. Thus, description will be made in this embodiment with a side on which an idler wheel is provided as the front side of a track frame and a side on which a reduction device and a drive wheel are provided as the rear side of the track frame. Moreover, each of side frames provided on both left and right sides of the track frame will be described with a center frame side as an inner side and a side opposite to the center frame as an outer side.

First, FIGS. 1 to 8 show a first embodiment of the present invention. A hydraulic excavator 1 constitutes a tracked vehicle in FIG. 1. The hydraulic excavator 1 is constituted by a tracked lower traveling structure 2 capable of traveling in a front-and-rear direction, an upper revolving structure 4 provided on the lower traveling structure 2, capable of revolving through a revolving device 3, and a front device 5 provided on a front side of the upper revolving structure 4, capable of an operation facing up and down and performing an excavating work of earth and sand. The lower traveling structure 2 and the upper revolving structure 4 constitute a vehicle body of the hydraulic excavator 1. A backhoe-type front device is exemplified as the front device 5, but a loading-excavator type front device may be also applied.

Figure 2:
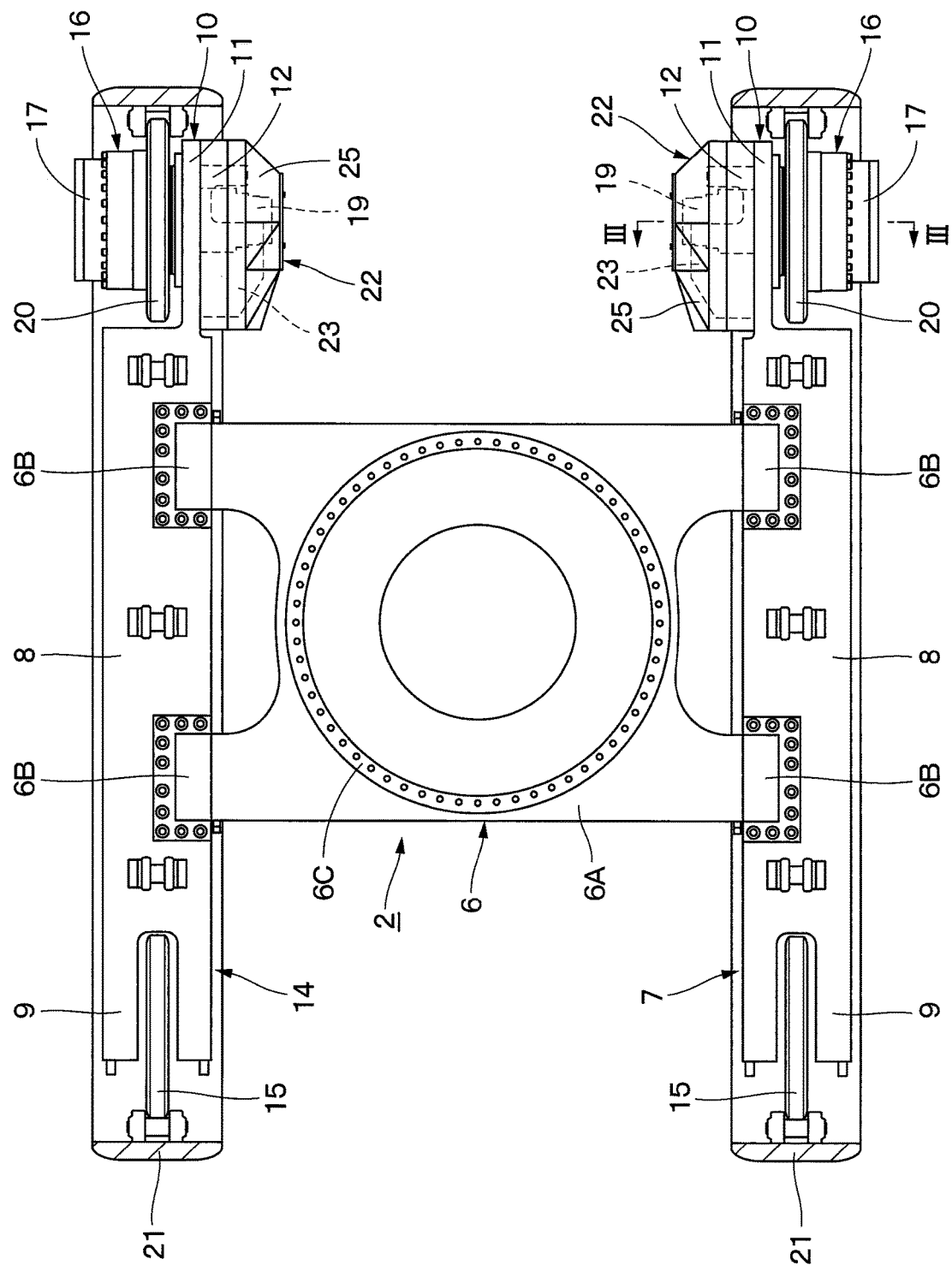
FIG. 2 is a plan view showing a lower traveling structure in FIG. 1 with an upper part of a crawler belt cut away.

Here, the tracked lower traveling structure 2 travels on an irregular land with rocks, stones and the like. As shown in FIG. 2, the lower traveling structure 2 is constituted by including a center frame 6 which will be described later, a left side frame 7, a right side frame 14, an idler wheel 15, a reduction device 16, a drive wheel 20, a crawler belt 21, and a motor guard 22.

The center frame 6 forms a track frame together with the left side frame 7 and the right side frame 14. The center frame 6 forms a support structural body of the lower traveling structure 2. The center frame 6 forms a center part in a left-and-right direction of the track frame. As shown in FIG. 2, the center frame 6 is formed as a plate-worked structural body having a substantially H-shape as a whole by welding a plurality of steel plates. The center frame 6 is constituted by a body frame portion 6A forming the center part, four leg bodies 6B in total provided on both left and right sides of the body frame portion 6A at an interval in the front-and-rear direction, and a cylindrical support cylindrical body 6C having a large diameter and provided on the body frame portion 6A by protruding to the upper side. A revolving ring of the revolving device 3 is mounted on the support cylindrical body 6C.

The left side frame 7 is provided on the left side of the center frame 6 by extending in the front-and-rear direction. The left side frame 7 is mounted on two leg bodies 6B located on the left side of the center frame 6. The left side frame 7 has a frame body 8 formed as an inverse U-shaped groove structural body extending in the front-and-rear direction. An idler wheel bracket 9 is provided on the front side of the frame body 8. An idler wheel 15 is mounted on the idler wheel bracket 9 through a yoke (not shown) and the like, rotatably and movably in the front-and-rear direction.

On the other hand, a drive wheel bracket 10 is provided on a rear side of the frame body 8. A drive wheel 20 is mounted on this drive wheel bracket 10 through a reduction device 16 which will be described later. The drive wheel bracket 10 is constituted by an annular reduction gear mounting portion 11 having a circular insertion hole 11A formed at the center part, an extended wall portion 12 extending from a periphery of the reduction gear mounting portion 11 toward an inner side in the left-and-right direction which is the center frame 6 side, and a plurality of cover stays 13 provided on an inner peripheral surface of the extended wall portion 12.

Figure 3:
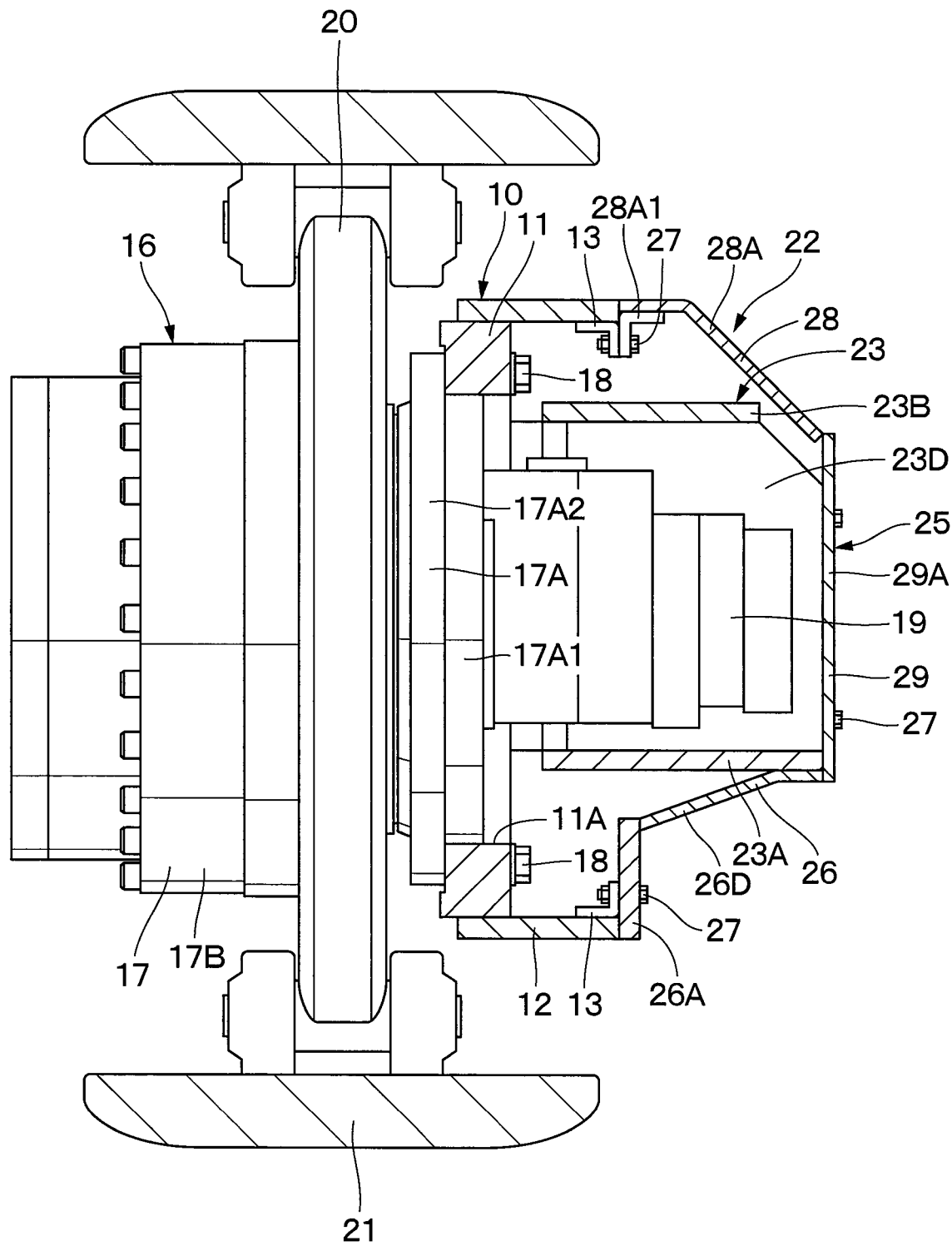
FIG. 3 is an enlarged sectional view showing a side frame, a reduction device, a drive wheel, the crawler belt, and a motor guard seen from an arrow III-III direction in FIG. 2.
Figure 6:
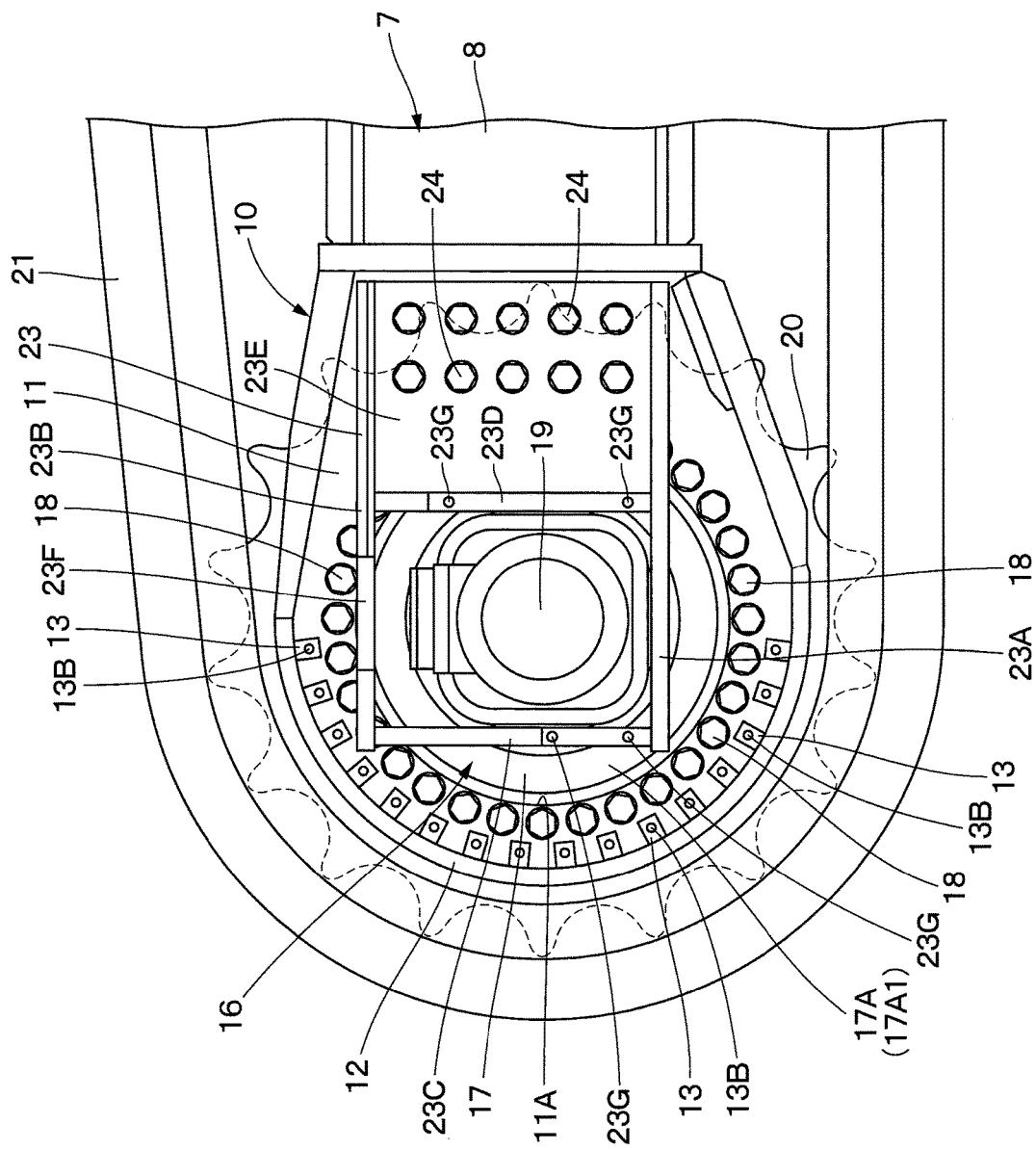
FIG. 6 is an enlarged view of the rear part of the lower traveling structure in a state where the traveling motor and an inner guard member exposed, shown from an inner side in a left-and-right direction.
Figure 7:
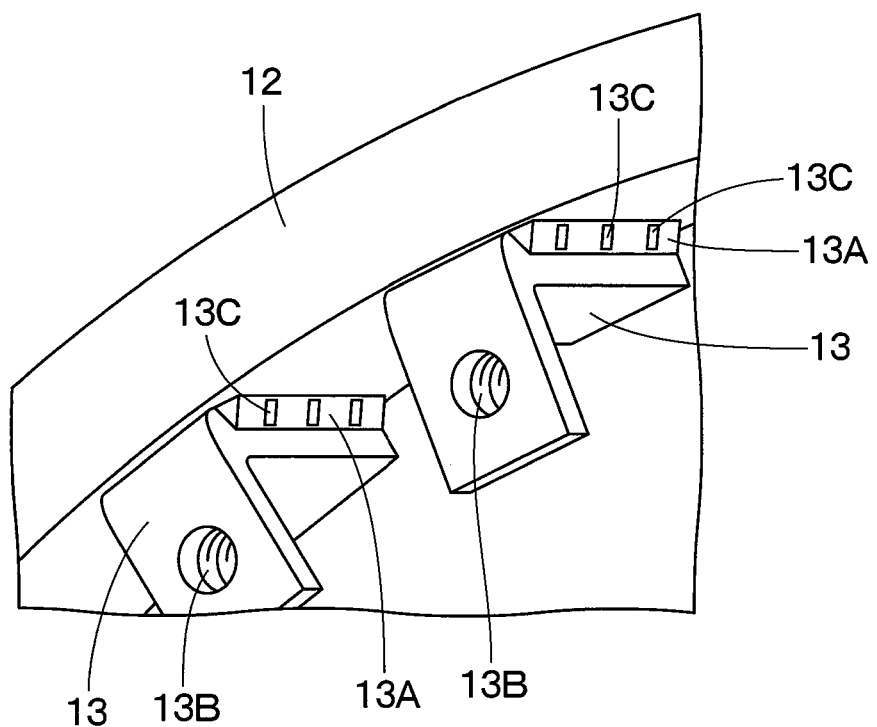
FIG. 7 is a perspective view showing a mounting state of a drive wheel bracket and a sensor in an enlarged manner.

An insertion portion 17A1 provided on a fixed-side housing 17A of the reduction gear 17 is inserted into the insertion hole 11A of the reduction gear mounting portion 11. Moreover, a plurality of bolt insertion holes (none of them is shown) is provided at positions on the periphery of the insertion hole 11A in the reduction gear mounting portion 11. As shown in FIGS. 3 and 6, a mounting flange portion 17A2 provided on the fixed-side housing 17A of the reduction gear 17 is mounted on an outer side surface of the reduction gear mounting portion 11 by using a plurality of bolts 18.

As shown in FIGS. 3, 5, 6, and 7, each of the cover stays 13 is made of a plate body bent into an L-shape, and one of flat plate portions is fixed to the inner peripheral surface of the extended wall portion 12 by welding means (welding bead 13A). Moreover, a screw hole (including a welding nut) 13B with which a bolt 27 is screwed from an inner side in the left-and-right direction is formed in the other flat plate portion of each of the cover stays 13. A lower split guard portion 26 and an upper split guard portion 28 of an outer guard member 25 which will be described later are mounted on the cover stay 13 appropriately selected from each of the cover stays 13 by using the bolt 27.

Here, a sensor 13C (see FIG. 7) such as a distortion gauge, a crack gauge or the like is mounted on each of the cover stays 13 at the welding bead 13A thereof. The sensor 13C detects distortion or a crack of a mounting portion of each of the cover stays 13 and outputs it to a monitoring system. The monitoring system can monitor a broken state of the outer guard member 25 on the basis of the data output by the sensor 13C and proposes replacement of the outer guard member 25 at appropriate timing.

Moreover, the welding bead 13A applied to each of the cover stays 13 has mounting strength to the extended wall portion 12 set lower than the strength of the left side frame 7. Therefore, it is such a structure that, when a load by an external force acts on the outer guard member 25, the outer guard member 25 is broken before an influence by the load to the left side frame 7 acts. As a result, the action of the load on the left side frame 7 which is hard to be repaired can be suppressed, and the left side frame 7 can be protected.

As shown in FIG. 2, the right side frame 14 is provided on the right side of the center frame 6 by extending in the front-and-rear direction. The right side frame 14 is mounted on the two leg bodies 6B located on the right side of the center frame 6. Since the right side frame 14 forms a shape symmetric to the left side frame 7 in the left-and-right direction, the name, symbols and the like used in the description of the constitution of the left side frame 7 are applied and the description will be omitted.

As shown in FIG. 2, the idler wheel 15 is provided on the front sides which are one sides in the front-and-rear direction of the left side frame 7 and the right side frame 14, respectively. That is, the idler wheel 15 is mounted on the idler wheel bracket 9 of each of the side frames 7 and 14 through a yoke (not shown) or the like, rotatably and movably in the front-and-rear direction.

The reduction device 16 is provided on the rear sides which are the other sides in the front-and-rear direction of the left side frame 7 and the right side frame 14, respectively. In this embodiment, the left and right reduction devices 16 form a symmetric shape in the left-and-right direction. Thus, the reduction device 16 mounted on the left side frame 7 will be described, and the description of the reduction device 16 mounted on the right side frame 14 will be omitted. The reduction device 16 causes the hydraulic excavator 1 to run by circulating/driving the crawler belt 21 by rotating the drive wheel 20 which will be described later. As shown in FIG. 3, the reduction device 16 is constituted by the reduction gear 17 and the traveling motor 19.

The reduction gear 17 is constituted by including a fixed-side housing 17A on which the traveling motor 19 is provided, a rotation-side housing 17B provided rotatably with respect to the fixed-side housing 17A and rotating the drive wheel 20 by being driven by the traveling motor 19, and a gear mechanism (not shown) accommodated in the rotation-side housing 17B and reducing a speed of rotation of the traveling motor 19. The fixed-side housing 17A includes an insertion portion 17A1 inserted into the insertion hole 11A of the reduction gear mounting portion 11 in a positioned state, a mounting flange portion 17A2 made of a flange-shaped body obtained by expanding a base end portion of the insertion portion 17A1, and a plurality of screw holes (not shown) provided over the entire circumference of the mounting flange portion 17A2. Here, the reduction gear 17 has the rotation-side housing 17B rotated by the gear mechanism. That is, an output side of the reduction gear 17 is the rotation-side housing 17B.

The fixed-side housing 17A brings the mounting flange portion 17A2 into contact with the outer side surface of the reduction gear mounting portion 11 by inserting the insertion portion 17A1 into the insertion hole 11A of the reduction gear mounting portion 11 from the outer side in the left-and-right direction. In this state, a bolt 18 inserted into each of the bolt insertion holes of the reduction gear mounting portion 11 is screwed with each of the screw holes provided in the mounting flange portion 17A2. As a result, the reduction gear 17 is mounted on the drive wheel bracket 10 of the left side frame 7 through the fixed-side housing 17A.

The traveling motor 19 is formed as a hydraulic motor mounted on the fixed-side housing 17A. Moreover, the traveling motor 19 is provided by protruding to an inner side in the left-and-right direction from the reduction gear mounting portion 11 of the drive wheel bracket 10 constituting the left side frame 7 toward the center frame 6. That is, as shown in FIG. 3, the traveling motor 19 goes beyond the crawler belt 21 which will be described later and the extended wall portion 12 of the drive wheel bracket 10 and protrudes to the outer side of the extended wall portion 12.

The drive wheel 20 is provided by being connected to the rotation-side housing 17B which is an output side of the reduction gear 17 of the reduction device 16. As shown in FIG. 6, the drive wheel 20 is constituted as a sprocket having a plurality of claw portions protruding to an outer side in a radial direction, for example.

As shown in FIG. 3, the crawler belt 21 is looped around the idler wheel 15 and the drive wheel 20. The crawler belt 21 circulates between the idler wheel 15 and the drive wheel 20 by being driven by the reduction device 16 and causes the lower traveling structure 2 to run.

Subsequently, constitution and functions of the motor guard 22 which is a feature portion of the first embodiment will be described in detail.

Figure 4:
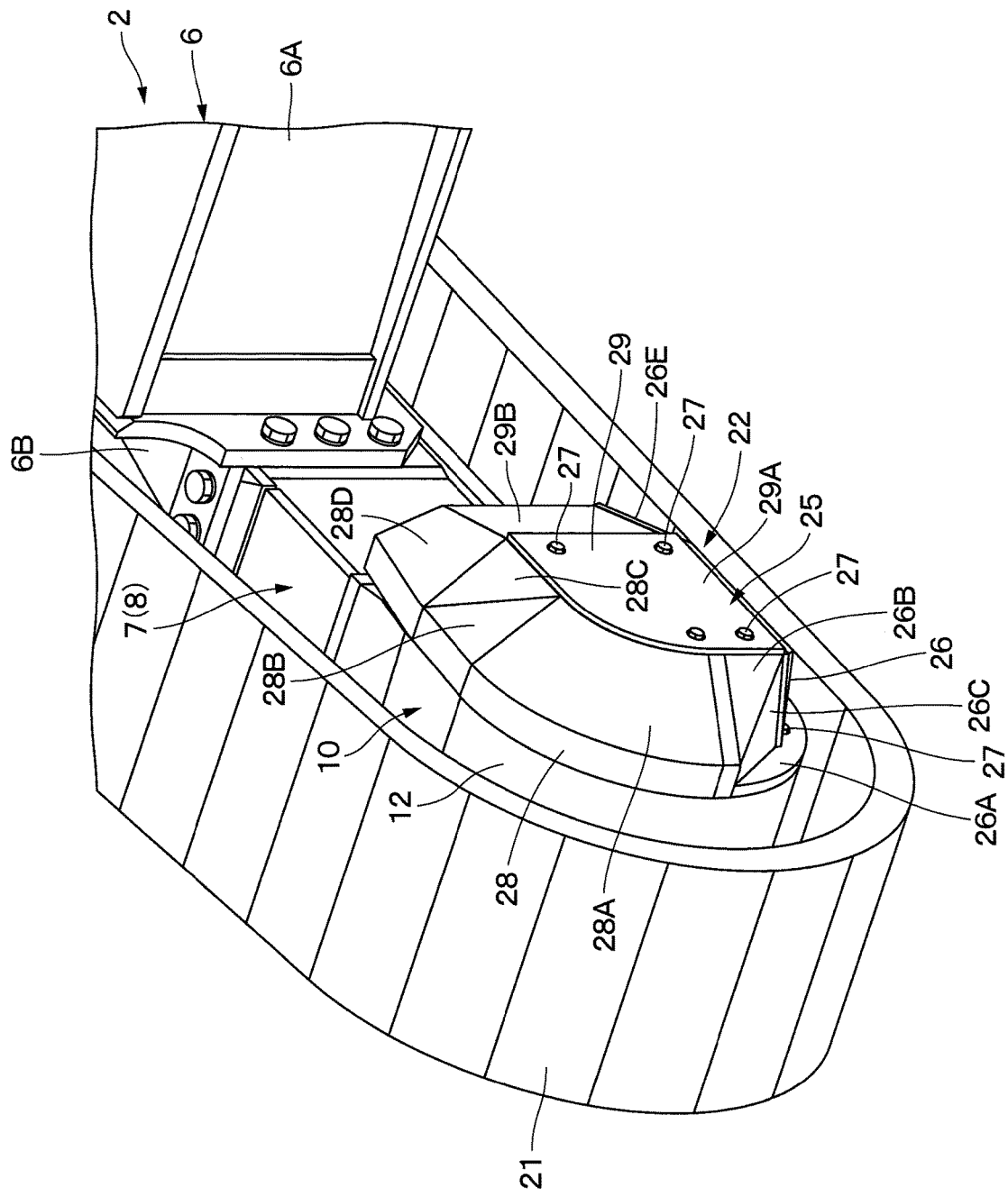
FIG. 4 is a perspective view with an essential part enlarged, showing a rear part of the lower traveling structure in a state where the motor guard covers a traveling motor.
Figure 5:
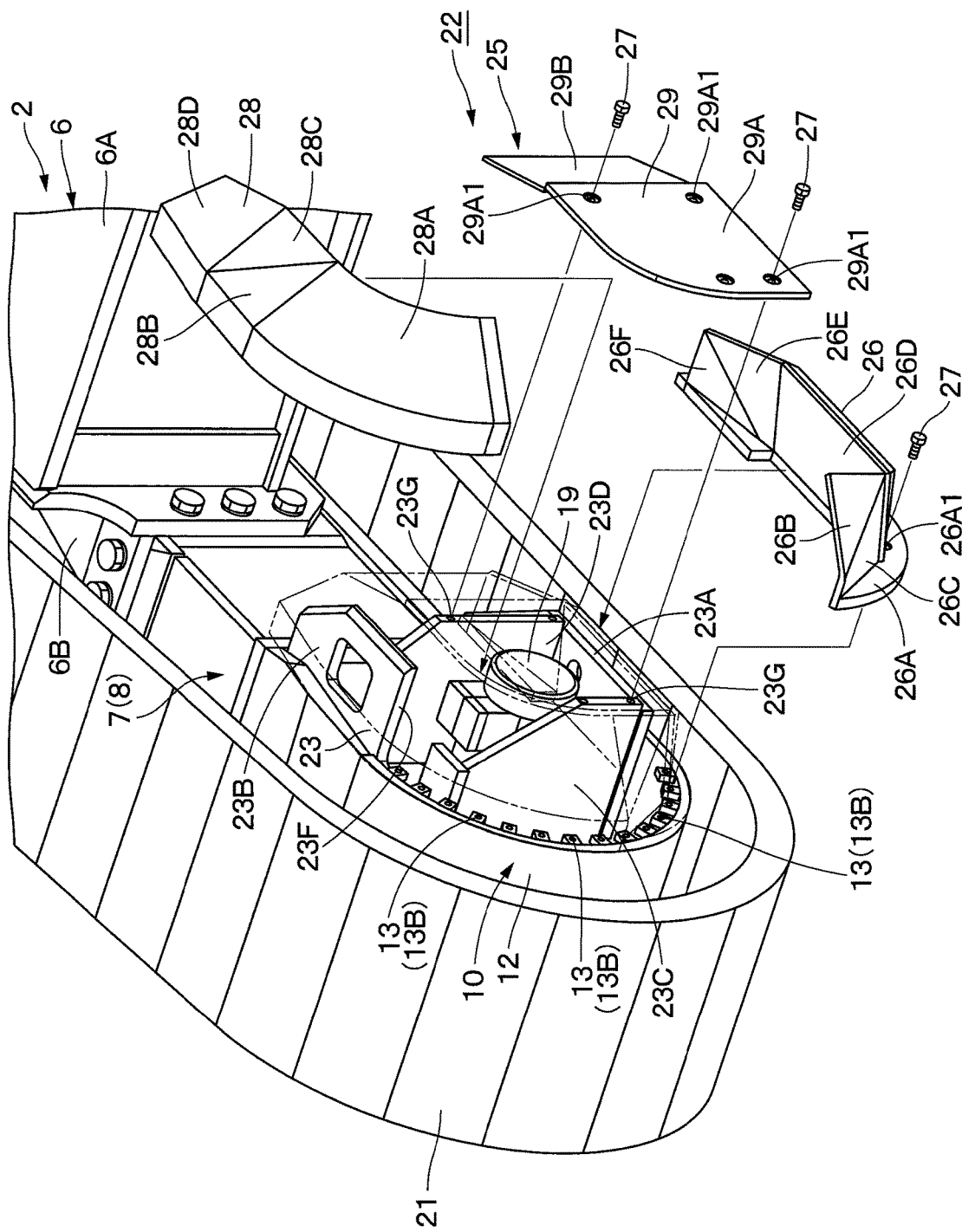
FIG. 5 is an exploded perspective view of the rear part of the lower traveling structure together with an outer guard member in a state where the rear part is exploded when seen from a position similarly to that in FIG. 4.

As shown in FIGS. 3 to 5, the motor guard 22 is provided on the rear sides which are the other sides in the front-and-rear direction of the left side frame 7 and the right side frame 14, respectively. The motor guard 22 provided on the left side frame 7 and the motor guard 22 provided on the right side frame 14 form a symmetrical shape in the left-and-right direction in the embodiment. Thus, the motor guard 22 provided on the left side frame 7 will be described, and the description of the motor guard 22 provided on the right side frame 14 will be omitted. The motor guard 22 covers the traveling motor 19 of the reduction device 16. The motor guard 22 is constituted by an inner guard member 23 which will be described later and the outer guard member 25.

The inner guard member 23 is mounted on the drive wheel bracket 10 of the left side frame 7 so as to cover the traveling motor 19. The inner guard member 23 has strength larger than the strength of the outer guard member 25 in view of durability and rigidity against an impact at a collision of a rock, stone or the like, for example. The inner guard member 23 is formed by fixing a plurality of metal plates each having a sufficient thickness dimension by using welding means as an example of means for improving the strength.

Figure 8:
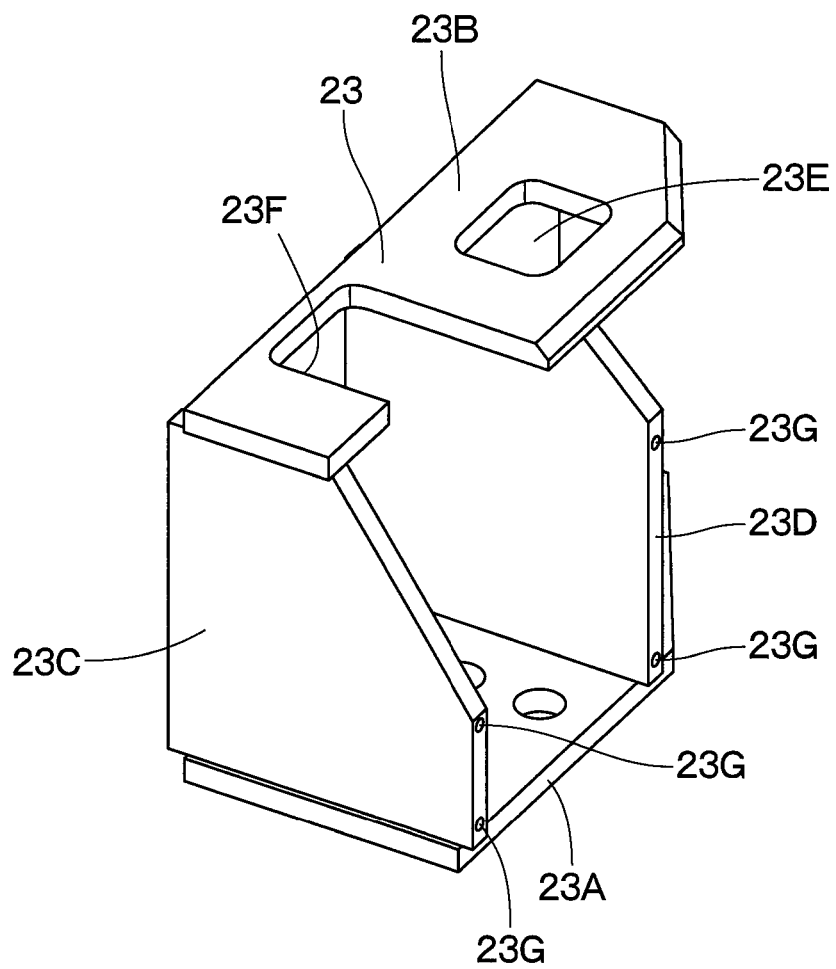
FIG. 8 is a perspective view showing the inner guard member as a single body.

The inner guard member 23, as shown in FIG. 8, is constituted by a lower guard plate 23A provided by extending in the front-and-rear direction so as to cover the traveling motor 19 from the lower side, an upper guard plate 23B provided by extending in the front-and-rear direction so as to cover the traveling motor 19 from the upper side, a rear guard plate 23C provided by extending in a vertical direction between the lower guard plate 23A and the upper guard plate 23B so as to cover the traveling motor 19 from the rear side, a front guard plate 23D provided by extending in the vertical direction between the lower guard plate 23A and the upper guard plate 23B so as to cover the traveling motor 19 from the front side, and a mounting plate 23E located closer to the front side than the front guard plate 23D and provided between the lower guard plate 23A and the upper guard plate 23B.

The inner guard member 23 surrounds the traveling motor 19 by the lower guard plate 23A, the upper guard plate 23B, the rear guard plate 23C, and the front guard plate 23D from the lower direction, the upper direction, the rear direction, and the front direction. As a result, the inner guard member 23 has constitution that protects the traveling motor 19 from colliding rocks and stones or falling-down rocks and stones during traveling.

A notch portion 23F is formed in the upper guard plate 23B at a position immediately above the traveling motor 19. A wire for lifting can be inserted through this notch portion 23F when the traveling motor 19 is removed and lifted. As a result, the traveling motor 19 can be removed from the reduction gear 17 in a state where the inner guard member 23 is still mounted, and maintenance, replacement works and the like can be performed easily.

A plurality of or two each separately in the vertical direction, that is, four screw holes 23G in total are provided in the rear guard plate 23C and the front guard plate 23D. The bolt 27 for mounting an intermediate split guard portion 29 of the outer guard member 25 which will be described later on the inner guard member 23 is screwed with each of the screw holes 23G.

As shown in FIG. 6, the inner guard member 23 brings the mounting plate 23E into contact with the reduction gear mounting portion 11 of the drive wheel bracket 10 and is integrally mounted on the reduction gear mounting portion 11 by using a plurality of bolts 24 in this state.

Here, a material, a plate thickness dimension, a welding method (welding length dimension) of each of the guard plates 23A, 23B, 23C, 23D, and the mounting plate 23E, and a material, a thickness, a size of a screw thread and the like of the bolt 24, for example, in the inner guard member 23 are determined as appropriate. As a result, the strength (durability, rigidity) against the impact when rocks, stones and the like collide are set for the inner guard member 23.

The strength of the inner guard member 23 is set lower (weaker) than the strength of the left side frame 7 in the embodiment. On the other hand, the strength of the inner guard member 23 is set higher (stronger) than the strength of the outer guard member 25. Moreover, the inner guard member 23 has a gap from the traveling motor 19 formed, and this gap can be deformed as a deformation margin so that an impact can be efficiently absorbed.

Therefore, the inner guard member 23 has constitution which can bear an external force of such intensity that breaks the outer guard member 25 and thus, can suppress an influence by the external force and protect the traveling motor 19. Moreover, the inner guard member 23 has constitution that the inner guard member 23 is broken before the left side frame 7 when such a larger external force that breaks the left side frame 7 acts. As a result, a load of the external force can be absorbed in a process in which the inner guard member 23 is broken, the action of the load on the left side frame 7 can be suppressed, and the left side frame 7 can be also protected.

As shown in FIGS. 4 and 5, the outer guard member 25 covers the inner guard member 23 from the outer side. The outer guard member 25 is provided on the reduction gear mounting portion 11 of the drive wheel bracket 10 constituting the left side frame 7 and the inner guard member 23. The outer guard member 25 is formed having strength lower than the strength of the inner guard member 23 while having durability and rigidity against the impact by a collision of rocks, stones and the like. Moreover, the outer guard member 25 has a gap from the traveling motor 19 formed, and this gap can be deformed as a deformation margin and can efficiently absorb the impact. The outer guard member 25 is constituted by the lower split guard portion 26, the upper split guard portion 28, and the intermediate split guard portion 29 as split guard portions.

The lower split guard portion 26 constitutes a lower part of the outer guard member 25. The lower split guard portion 26 protects the lower side of the traveling motor 19, that is, the traveling motor 19 from an impact at a collision with rocks, stones and the like during traveling. The lower split guard portion 26 is constituted by a mounting plate 26A with its rear side curved so as to correspond to an arc shape of the reduction gear mounting portion 11 (extended wall portion 12) and the front side extending to a front end position of the inner guard member 23, rear surface plates 26B and 26C provided on a rear part of the mounting plate 26A and covering the traveling motor 19 from a diagonally lower rear side, an intermediate surface plate 26D provided by extending from a lower end edge of the rear surface plate 26C toward the front side and covering the traveling motor 19 from the lower side, and front surface plates 26E and 26F provided by extending from a rear end edge of the intermediate surface plate 26D toward the front side and covering the traveling motor 19 from diagonally lower front side.

The rear surface plates 26B and 26C, the intermediate surface plate 26D, and the front surface plates 26E and 26F are provided by protruding from the mounting plate 26A inward in the left-and-right direction which is the center frame 6 side. The rear surface plates 26B and 26C, the intermediate surface plate 26D, and the front surface plates 26E and 26F constitute an inclined surface inclined to at least one axis of an axis in the front-and-rear direction, an axis in the left-and-right direction, and an axis in the vertical direction. In other words, the rear surface plates 26B and 26C, the intermediate surface plate 26D, and the front surface plates 26E and 26F are inclined to any one of a perpendicular surface extending in the front-and-rear direction, a perpendicular surface extending in the left-and-right direction, and a horizontal surface. As a result, the rear surface plates 26B and 26C, the intermediate surface plate 26D, and the front surface plates 26E and 26F can diffuse an impact of a collision of a rock, a stone or the like from the front side or the rear side during traveling by the inclined surface.

The rear surface plates 26B and 26C, the intermediate surface plate 26D, and the front surface plates 26E and 26F are formed integrally by welding metal plates cut out into predetermined shapes. It is to be noted that the rear surface plates 26B and 26C, the intermediate surface plate 26D, and the front surface plates 26E and 26F can be formed by bending one or a plurality of metal plates or by using a curved surface plate.

The mounting plate 26A has a plurality of bolt through holes 26A1 (only one of them is shown in FIG. 5). The mounting plate 26A is mounted on the reduction gear mounting portion 11 (extended wall portion 12) by screwing the bolt 27 as a fastening member inserted into this bolt through hole 26A1 with the screw hole 13B provided in the cover stay 13 of the reduction gear mounting portion 11.

The lower split guard portion 26 is formed having strength higher than the strength of the upper split guard portion 28 and the intermediate split guard portion 29 which will be described later. The plate thickness dimensions of the rear surface plates 26B and 26C, the intermediate surface plate 26D, and the front surface plates 26E and 26F constituting the lower split guard portion 26 are set to dimensions larger than the plate thickness dimensions of a curved surface plate 28A, upper surface plates 28B, 28C, and 28D of the upper split guard portion 28, a rear center surface plate 29A, and a front center surface plate 29B of the intermediate split guard portion 29. As a result, the lower split guard portion 26 can bear a large impact generated at a collision with rocks, stones and the like during traveling. On the other hand, the lower split guard portion 26 absorbs the impact by being broken (deformed, damaged) when a larger impact acts.

The upper split guard portion 28 constitutes an upper part of the outer guard member 25. The upper split guard portion 28 protects the upper side of the traveling motor 19, that is, the traveling motor 19 from an impact at a collision of a falling-down rock, stone or the like. The upper split guard portion 28 is constituted by the curved surface plate 28A curved so as to correspond to the arc shape of the reduction gear mounting portion 11 (extended wall portion 12) and covering the traveling motor 19 from diagonally upper rear side and upper surface plates 28B, 28C, and 28D provided by extending from a rear end edge of the curved surface plate 28A to the front side and covering the traveling motor 19 from the upper side.

The curved surface plate 28A, the upper surface plates 28B, 28C, and 28D are provided by protruding to the inner side in the left-and-right direction which is the center frame 6 side. The curved surface plate 28A, the upper surface plates 28B, 28C, and 28D constitute an inclined surface inclined to at least one axis of the axis in the front-and-rear direction, the axis in the left-and-right direction, and the axis in the vertical direction. In other words, the curved surface plate 28A, the upper surface plates 28B, 28C, and 28D are inclined to any one of the perpendicular surface extending in the front-and-rear direction, the perpendicular surface extending in the left-and-right direction, and the horizontal surface similarly to the rear surface plates 26B and 26C, the intermediate surface plate 26D, and the front surface plates 26E and 26F of the lower split guard portion 26. As a result, the impact when the falling-down rock, stone or the like collides from above can be diffused on the inclined surface.

The curved surface plate 28A, the upper surface plates 28B, 28C, and 28D are integrally formed by welding metal plates cut out into predetermined shapes. It is to be noted that the curved surface plate 28A, the upper surface plates 28B, 28C, and 28D can be formed by bending one or a plurality of metal plates.

A plurality of mounting stays 28A1 (only one of them is shown in FIG. 3) is provided on an inner side of the curved surface plate 28A. A bolt through hole (not shown) is formed at a position corresponding to the screw hole 13B of the cover stay 13 in each of the mounting stays 28A1. The curved surface plate 28A is mounted on the reduction gear mounting portion 11 (extended wall portion 12) by screwing the bolt 27 as a fastening member inserted into the bolt through hole of each of the mounting stays 28A1 with the screw hole 13B provided in the cover stay 13 of the reduction gear mounting portion 11.

The upper split guard portion 28 is formed having strength lower than the strength of the lower split guard portion 26 and the strength equal to or higher than the strength of the intermediate split guard portion 29 which will be described later. The plate thickness dimensions of the curved surface plate 28A, the upper surface plates 28B, 28C, and 28D constituting the upper split guard portion 28 are set to dimensions smaller than the plate thickness dimensions of the rear surface plates 26B and 26C, the intermediate surface plate 26D, and the front surface plates 26E and 26F constituting the lower split guard portion 26.

As a result, the upper split guard portion 28 can bear the impact of the falling-down rock or stone which has a value smaller than that of a large impact generated at a collision with the rock, stone and the like during traveling. On the other hand, the upper split guard portion 28 absorbs the impact by being broken (deformed, damaged) when a larger impact acts similarly to the lower split guard portion 26. Furthermore, the upper split guard portion 28 formed by thin plates can reduce (lighten) the weight.

The intermediate split guard portion 29 constitutes an intermediate part in the vertical direction of the outer guard member 25. The intermediate split guard portion 29 protects the traveling motor 19 from an impact when a rock, a stone or the like collides against the traveling motor 19 from a lateral direction. The intermediate split guard portion 29 is constituted by a rear center surface plate 29A provided at a position between the lower split guard portion 26 and the upper split guard portion 28 and a front center surface plate 29B provided by extending from the front end edge of the rear center surface plate 29A to the front side at a position between the lower split guard portion 26 and the upper split guard portion 28. The rear center surface plate 29A covers the traveling motor 19 from the inner side in the left-and-right direction.

The rear center surface plate 29A is mounted on the inner guard member 23. More specifically, a bolt through hole 29A1 (see FIG. 5) is formed in the rear center surface plate 29A at a position corresponding to each of the screw holes 23G provided in the rear guard plate 23C and the front guard plate 23D of the inner guard member 23. As a result, the rear center surface plate 29A is mounted on the inner guard member 23 by screwing the bolt 27 as a fastening member inserted into each of the bolt through holes 29A1 with each of the screw holes 23G of the inner guard member 23. The rear center surface plate 29A and the front center surface plate 29B are integrally formed by welding the metal plates cut out into predetermined shapes. It is to be noted that the rear center surface plate 29A and the front center surface plate 29B can be formed by bending one sheet of the metal plate.

The intermediate split guard portion 29 is formed having strength lower than the strength of the lower split guard portion 26 and the strength equal to or smaller than the strength of the upper split guard portion 28. The plate thickness dimensions of the rear center surface plate 29A and the front center surface plate 29B are set to dimensions smaller than the plate thickness dimensions of the rear surface plates 26B, 26C, the intermediate surface plate 26D and the front surface plates 26E and 26F constituting the lower split guard portion 26.

As a result, the intermediate split guard portion 29 can bear the impact generated when a rock, a stone or the like collides. On the other hand, the intermediate split guard portion 29 absorbs the impact by being broken (deformed, damaged) when a larger impact acts similarly to the lower split guard portion 26 and the upper split guard portion 28. Moreover, the weight of the intermediate split guard portion 29 made of a thin plate can be reduced.

The outer guard member 25 constituted as above is split into three members, that is, the lower split guard portion 26, the upper split guard portion 28, and the intermediate split guard portion 29 as shown in FIG. 5. Therefore, the weight of each of the lower split guard portion 26, the upper split guard portion 28, and the intermediate split guard portion 29 can be reduced, and attachment/detachment can be made easily without using a crane or the like. Moreover, only the damaged split cover portion can be replaced. Furthermore, strength of each of the lower split guard portion 26, the upper split guard portion 28, and the intermediate split guard portion 29 can be set as appropriate in accordance with a target of a collision.

As shown in FIG. 1, a cab bed 30 is provided on the front part of the upper revolving structure 4 at a position on the left side of the front device 5. A cab 31 is provided on the upper side of this cab bed 30. A seat on which an operator is seated, an operating lever for traveling, an operating lever for work and the like (none of them is shown) are provided inside the cab 31.

The hydraulic excavator 1 according to the embodiment has the constitution as above, and an operation of the hydraulic excavator 1 will be described below.

The operator who got onboard the cab 31 can cause the lower traveling structure 2 to advance or to retreat by being seated on an operator's seat and operating the operating lever for traveling. On the other hand, an excavating work of rocks and sand and the like can be performed by operating the front device 5 and the like through the operation of the operating lever for working.

Here, when the hydraulic excavator 1 travels in the work site, rocks and stones are left on a traveling path or bouncing rocks, stones and the like fall down and the like. On the other hand, the traveling motor 19 of the reduction device 16 provided on the lower traveling structure 2 protrudes to the inner side in the left-and-right direction toward the center frame 6 beyond the crawler belt 21 and the extended wall portion 12 of the drive wheel bracket 10. Thus, rocks, stones and the like might collide against the traveling motor 19, and there is a concern that the traveling motor 19 is broken.

Thus, according to the embodiment, the traveling motor 19 is mounted on the reduction gear 17 in a state protruding to the inner side in the left-and-right direction from each of the side frames 7 and 14 toward the center frame 6. Moreover, the motor guard 22 is constituted by the inner guard member 23 covering the traveling motor 19 and the outer guard member 25 covering the inner guard member 23 from the outer side.

Therefore, when there are rocks, stones, and the like on the traveling path of the hydraulic excavator 1, the motor guard 22 can protect the traveling motor 19 from the rocks, stones, and the like. Particularly, the motor guard 22 is formed having a double structure by the inner guard member 23 and the outer guard member 25. As a result, even if the outer guard member 25 collides against rocks and stones and is deformed or broken, the traveling motor 19 can be protected by the inner guard member 23. Moreover, deformation or breakage of the outer guard member 25 causes absorption of the impact (energy) at a collision against the rocks and stones, and an influence of a load acting on the inner guard member 23 can be suppressed.

As a result, since there is no need to increase the plate thickness dimension or to add a reinforcing rib for the motor guard 22, the traveling motor 19 can be protected by the motor guard 22 with a simple structure. As a result, the constitution of the motor guard 22 is simplified and moreover, durability and reliability can be improved. Furthermore, since the constitution of the motor guard 22 is simplified, the weight of the motor guard 22 can be reduced.

On the other hand, the inner guard member 23 has strength higher than the strength (durability, rigidity against the impact) of the outer guard member 25 in the embodiment. As a result, even if the outer guard member 25 is broken by the impact from the outside, this impact can be further received by the inner guard member 23. As a result, the inner guard member 23 can protect the traveling motor 19.

Moreover, the strength of the motor guard 22 (the inner guard member 23, the outer guard member 25) is set lower than the strength of each of the side frames 7 and 14. Therefore, when a large external force which could break the left side frame 7 acts on the motor guard 22, the motor guard 22 is deformed or broken prior to the left side frame 7. As a result, the motor guard 22 can suppress the large external force acting on the side frames 7 and 14 which cannot be repaired easily.

The outer guard member 25 of the motor guard 22 has the inclined surface inclined to at least one axis of the axis in the front-and-rear direction, the axis in the left-and-right direction, and the axis in the vertical direction. In other words, the rear surface plates 26B and 26C, the intermediate surface plate 26D, the front surface plates 26E and 26F of the lower split guard portion 26, the curved surface plate 28A, the upper surface plates 28B, 28C, and 28D of the upper split guard portion 28, and the front center surface plate 29B of the intermediate split guard portion 29 as inclined surfaces are inclined to any one of the perpendicular surface extending in the front-and-rear direction, the perpendicular surface extending in the left-and-right direction, and the horizontal surface.

As a result, an impact when rocks, stones, and the like collide from the lower side, the upper side, the front side, and the rear side during traveling, it can be diffused on the inclined surface, whereby durability and rigidity can be improved. Moreover, the lower split guard portion 26, the upper split guard portion 28, and the intermediate split guard portion 29 can be formed three-dimensionally by combining the inclined surfaces inclined in different directions. As a result, even if a thin plate material is used, the lower split guard portion 26, the upper split guard portion 28, and the intermediate split guard portion 29 can be formed with high strength.

The outer guard member 25 of the motor guard 22 is constituted by a plurality of split guard portions, that is, the lower split guard portion 26, the upper split guard portion 28, and the intermediate split guard portion 29. Moreover, the lower split guard portion 26, the upper split guard portion 28, and the intermediate split guard portion 29 are mounted on the side frames 7 and 14 or the inner guard member 23 by using the bolt 27 as a fastening member.

Therefore, since the weight of each of the lower split guard portion 26, the upper split guard portion 28, and the intermediate split guard portion 29 can be reduced, manual attachment/detachment can be performed easily without using a crane or the like. Moreover, only a damaged split cover portion can be replaced. On the other hand, the strength of the lower split guard portion 26, the upper split guard portion 28, and the intermediate split guard portion 29 which are split can be set to appropriate strength according to an impact directed up from the lower side, an impact by fall of rocks, stones, and the like, for example. Moreover, the strength of the lower split guard portion 26, the upper split guard portion 28, and the intermediate split guard portion 29 can be adjusted easily by changing the thickness of the bolt 27, the size of the screw thread and the like.

Subsequently, FIG. 9 shows a second embodiment of the present invention. A feature of this embodiment is provision of a reinforcing member on the outer guard member in order to improve strength of the outer guard member. It is to be noted that the same reference numerals are given to the same constituent elements in this embodiment as those in the aforementioned first embodiment, and the description therefor will be omitted.

In FIG. 9, a plurality of spikes 41 or three spikes, for example, is provided on an outer surface of the rear surface plate 26C forming the lower split guard portion 26 of the outer guard member 25. Each of the spikes 41 constitutes the reinforcing member for improving the strength of the lower split guard portion 26 of the outer guard member 25. Each of the spikes 41 is formed having a truncated cone shape by using a material excellent in abrasion resistance and is fixed to the rear surface plate 26C by welding means, screwing and the like. It is to be noted that the number and the shape of the spikes 41 are not limited to those described above.

A plurality of sliders 42 or four sliders, for example, is provided on an outer surface of the intermediate surface plate 26D forming the lower split guard portion 26. Moreover, a plurality of sliders 43 or two sliders, for example, is provided on an outer surface of the front surface plate 26E forming the lower split guard portion 26. Each of the sliders 42 and 43 constitutes a reinforcing member for improving the strength of the lower split guard portion 26 of the outer guard member 25. Each of the sliders 42 and 43 is formed having a long plate shape by using a material excellent in abrasion resistance to which quenching or the like is applied, for example. The slider 42 is fixed to the intermediate surface plate 26D, and the slider 43 is fixed to the front surface plate 26E by welding means, screwing and the like. It is to be noted that the number and the shape of each of the sliders 42 and 43 is not limited to those described above.

Thus, the actions and effects similar to those in the first embodiment described above can be obtained also in the second embodiment constituted as above. Particularly, according to the second embodiment, the spikes 41 and the sliders 42 and 43 are provided on the lower split guard portion 26 of the outer guard member 25. As a result, abrasion or damage on the lower split guard portion 26 can be suppressed, and the strength of the lower split guard portion 26 can be improved.

It is to be noted that the first embodiment may be constituted by providing a film of a resin material so as to cover the surfaces of the inner guard member 23 and the outer guard member 25 of the motor guard 22. As a result, the durability of the inner guard member 23 and the outer guard member 25 can be improved. This constitution can be also applied to the second embodiment similarly.

The first embodiment exemplifies a case in which the outer guard member 25 is split into three members, that is, the lower split guard portion 26, the upper split guard portion 28, and the intermediate split guard portion 29. However, the present invention is not limited to that, and the outer guard member may be constituted to be split into two members or four members or more. This constitution can be also applied to the second embodiment similarly.

The first embodiment is constituted such that each of the cover stays 13 is fixed to the inner peripheral surface of the extended wall portion 12 constituting the drive wheel bracket 10 by welding means. However, the present invention is not limited to that and may be constituted such that the cover stay is fixed to the inner peripheral surface of the extended wall portion 12 by using a bolt. This constitution can be also applied to the second embodiment similarly.

In each of the embodiments, the case in which the super large-sized hydraulic excavator 1 including the tracked lower traveling structure 2 is applied as a typical example of a tracked vehicle is described as an example. However, the present invention is not limited to that and can be also applied to a medium-sized or small-sized hydraulic excavator on which a cab is directly mounted on the revolving frame.

DESCRIPTION OF REFERENCE NUMERALS

1: Hydraulic excavator (Tracked vehicle)
2: Lower traveling structure (Vehicle body)
4: Upper revolving structure (Vehicle body)
6: Center frame
7: Left side frame
14: Right side frame
15: Idler wheel
16: Reduction device
17: Reduction gear
17B: rotation-side housing (Output side)
19: Traveling motor
20: Drive wheel
21: Crawler belt
22: Motor guard
23: Inner guard member
25: Outer guard member
26: Lower split guard portion (Split guard portion)
26B, 26C: Rear surface plate (Inclined surface)
26D: Intermediate surface plate (Inclined surface)
26E, 26F: Front surface plate (Inclined surface)
27: Bolt (Fastening member)
28: Upper split guard portion (Split guard portion)
28A: Curved surface plate (Inclined surface)
28B, 28C, 28D: Upper surface plate (inclined surface)
29: Intermediate split guard portion (Split guard portion)
29B: Front center surface plate (Inclined surface)
41: Spike (Reinforcing member)
42, 43: Slider (Reinforcing member)

The invention claimed is:

1. A tracked vehicle comprising:
a center frame forming a support structural body of a vehicle body;
a side frame provided on both left and right sides of said center frame, respectively, by extending in a front-and-rear direction;
an idler wheel provided on first ends in the front-and-rear direction of said side frames, respectively;
a reduction device provided on second ends in the front-and-rear direction of said side frames, respectively,
said reduction device constituted by a reduction gear and a traveling motor;
a drive wheel connected to output sides of said reduction gears of the reduction devices, respectively;
a crawler belt looped around said idler wheels and said drive wheels, respectively; and
a motor guard provided on the second ends in the front-and-rear direction of said side frames, respectively, and covering said traveling motor of said reduction device,
wherein said traveling motor is mounted on said reduction gear in a state protruding to an inner side in a left-and-right direction from said side frames toward said center frame,
wherein said motor guard is constituted by an inner guard member having a lower guard plate located at a lower side of said traveling motor, an upper guard plate located at an upper side of said traveling motor, a rear guard plate located at a rear side of said traveling motor, and a front guard plate located at a front side of said traveling motor, and which has a gap from said traveling motor and which covers said traveling motor from the lower side, the upper side, the rear side, and the front side, and an outer guard member which has a gap from the lower side of said lower guard plate, the upper side of said upper guard plate, the front side of said front guard plate and the rear side of said rear guard plate, and which covers said lower guard plate, said upper guard plate, said front guard plate, and said rear guard plate from an outer side,
wherein said outer guard member is provided by protruding inward in the left-and-right direction which is the center frame side, and has an inclined surface inclined to at least one axis of an axis in the front-and-rear direction, an axis in the left-and-right direction, and an axis in a vertical direction, and
wherein a strength of said inner guard member is lower than a strength of said side frame and higher than a strength of said outer guard member.

2. The tracked vehicle according to claim 1,
wherein said outer guard member of said motor guard is constituted by a plurality of split guard portions; and
wherein said plurality of split guard portions are mounted on said side frame or said inner guard member by using a fastener.

3. The tracked vehicle according to claim 1,
wherein a reinforcing member for improving strength of said outer guard member is disposed on said outer guard member.

* * * * *